United States Patent [19]

Possell

[11] 4,186,554
[45] Feb. 5, 1980

[54] POWER PRODUCING CONSTANT SPEED TURBINE

[76] Inventor: Clarence R. Possell, 4842 Viane Way, San Diego, Calif. 92110

[21] Appl. No.: 845,441

[22] Filed: Oct. 25, 1977

Related U.S. Application Data

[63] Continuation-in-part of Ser. No. 630,430, Nov. 10, 1975, abandoned.

[51] Int. Cl.² ............................................. F02C 3/04
[52] U.S. Cl. ................................. 60/39.37; 60/39.75; 415/90; 416/229 A
[58] Field of Search ................ 60/39.36, 39.37, 39.32, 60/39.75; 415/90; 416/229

[56] References Cited

U.S. PATENT DOCUMENTS

| | | | |
|---|---|---|---|
| 2,087,834 | 7/1937 | Brown et al. | 415/90 |
| 2,567,079 | 9/1951 | Owner et al. | 60/39.37 |
| 2,631,427 | 3/1953 | Rainbow | 60/39.37 |
| 2,748,567 | 6/1956 | Dougherty | 60/39.32 |
| 2,821,067 | 1/1958 | Hill | 60/39.75 |
| 2,922,278 | 1/1960 | Szydlowski | 60/39.36 |
| 3,116,908 | 1/1964 | Wosika | 60/39.36 |
| 3,157,793 | 11/1964 | Adkins | 415/90 |
| 3,167,914 | 2/1965 | Savonuzzi | 60/39.32 |
| 3,632,222 | 1/1972 | Cronstedt | 60/39.75 |
| 3,738,105 | 6/1973 | Buchelt | 60/39.37 |

OTHER PUBLICATIONS

Stoddart, D.E., "Using Silicon Nitride for Gas Turbine Engines," Gas Turb. Intl., Jul.-Aug., 1972; pp. 16-19.

*Primary Examiner*—Robert E. Garrett
*Attorney, Agent, or Firm*—William C. Babcock

[57] ABSTRACT

A power producing constant speed rotary turbine in which an elongate shaft is rotatably supported in longitudinally spaced, axially aligned first and second housings that have a housing assembly disposed thereinbetween. The first housing rotatably supports a power take-off that is driven by a series of reduction gears operatively connected to the shaft. The second housing envelops an output power turbine rotor defined by a series of thin, circular, coaxially aligned, laterally spaced discs of high temperature metals or high temperature ceramic such as hot pressed silicon nitride that are operatively connected to the shaft.

A compressor rotor is mounted in an intermediate position on the shaft and rotates within the housing assembly, which assembly has an air inlet therein. As the compressor rotor rotates in the housing assembly, air is discharged to first and second groups of diffuser tubes that extend to first and second volute casings. The first and second volute casings are in communication with first and second combustion tubes in which first and second burners are disposed.

28 Claims, 6 Drawing Figures

POWER PRODUCING CONSTANT SPEED TURBINE

REFERENCE TO RELATED PATENT APPLICATION

This is a continuation-in-part of U.S. patent application Ser. No. 630,430, filed Nov. 10, 1975, now abandoned.

BACKGROUND OF THE INVENTION

1. FIELD OF THE INVENTION

This invention relates to turbine systems. In particular, this invention pertains to turbine systems including a power take-off in combination with a compressor rotor and a power turbine. More in particular, this invention is directed to a power producing constant speed turbine. Still further, this invention relates to a power producing constant speed turbine which utilizes a plurality of product of combustion streams passing in a helical manner through a multiplicity of longitudinally spaced and axially aligned turbine rotor discs. Further, this invention pertains to a power producing constant speed turbine where the rotor discs of the turbine are maintained in substantially constant speed responsive to the load applied to the turbine. Additionally, the instant invention relates to a power producing constant speed turbine wherein a plurality of nozzles emit products of combustion in a substantially tangential manner when taken with respect to an outer peripheral wall of the aligned rotor discs. Still further, the subject invention is directed to a power producing constant speed turbine that utilizes the concept of applying the centrifugal force in a radial outward direction which magnitude of such force is dependent upon the rotative speed of the rotors, against the radial force on the product of combustion gases radial inward force provided by the static pressure drop between the nozzles surrounding the rotor discs and exit passage formed longitudinally through the center of the axially aligned rotor discs.

2. DESCRIPTION OF THE PRIOR ART

In the past, single stage compressors used in combination with turbines have operated at a compression ratio of no greater than 5 to 1. In the present invention, a single stage centrifugal compressor is employed that is characterized by a number of diffuser tubes extending outwardly in spaced relationship from the rotor housing, with the tubes being arranged in first and second groups that are in communication with first and second volute casings. First and second combustion tubes extend from the first and second volute casings to the interior of a housing in which the turbine rotor is rotatably supported.

Due to the structure above-described, the single stage compression rotor, which is driven by the turbine rotor, produces air at a compression ratio of up to 25 to 1 in the combustion tubes in which burners are located. Hot gaseous products of combustion resulting from this compression ratio discharge to the turbine rotor at a temperature of between 2050° to 3000° F., and at high velocity. The turbine rotor is formed from a number of circular discs disposed in a side-by-side spaced relationship to define a number of circular passages therebetween. Gaseous products of combustion are subdivided into a number of streams within the interior of the turbine rotor housing and are directed tangentially onto the turbine rotor to enter circular passages defined between the discs. The turbine discs are generally circular or conical in overall contour and include an outer arcuately directed peripheral wall. The gaseous products of combustion are directed in a substantially tangential manner to the outer peripheral wall of the rotor discs. This allows the issuing products of combustion to have a high tangential velocity vector as opposed to a substantially low radial velocity vector. The centrifugal force applied to these issuing gases operation in an outward radial manner. Thus, with a rather low inward radial force, the outward centrifugal radial force which is dependent upon the rotary speed of the rotor discs, may be used to operate one against the other to provide a speed regulation mechanism.

When the load on the turbine system is increased, the turbine rotor discs tend to decrease in rotative speed, thus, the products of combustion radial inward force is increased to provide increasing frictional drag forces on the radial discs and such increases the rotative speed of the discs. In opposition, when the power take-off load is decreased, the rotative speed of the turbine rotor discs begins to increase thus, increasing the centrifugal force applied to the issuing gases. This tends to act on the gaseous products of combustion in an outward radial manner to drive such substantially external to the outer peripheral walls of the rotor discs. Less gaseous products are in frictional contact with the rotor discs and thus the frictional drag is reduced and the rotor discs begin to increase in rotative speed. The turbine discs are formed from high temperature metal or refractory material such as hot pressed silicon nitride that can withstand an operating temperature of 2500° F.

By increasing the inlet temperature of the hot gaseous products of combustion to 350° F. above the present operating temperature of 2000° F., the horsepower output of the present invention may be doubled over the prior art turbines of the same size, and the thermal efficiency increased from 36 percent to approximately 43 percent.

The present turbine has the operational advantage that it has but one-tenth of the emissions of equivalent size internal combustion engines. The present invention has the further advantage that it is capable of burning any fuel such as powdered coal, residual oils, a wide variety of liquid fuels, as well as combustible gases.

In operation, the gaseous products of combustion enter the turbine housing through nozzles that are positionally located substantially tangential to an outer peripheral wall of the longitudinally aligned plurality of rotor discs. As has hereinbefore been described, the tangential position and emission of the combustion gases is important in that such allows the speed control of the turbine responsive to the load applied. In any case, the combustion gases travel in a helical manner through circular passages defined by adjacently spaced turbine discs and frictionally drive the discs in a rotative manner. As a result, the discs are not subject to a succession of rapidly applied pulses such as may occur in the operation of conventional bladed turbine rotors, and the discs of the present invention are not subject to combined bending stresses, but rather only shear and centrifugal tensile loads.

A major object of the present invention is to provide a power producing rotary turbine that is capable of reducing exhaust emissions by a factor of ten relative to present day internal combustion engines, is compact and capable of producing a high power output relative to the weight and size thereof, and one that operates with substantially increased thermal efficiency relative to prime movers of prior art design.

Another major object of the present invention is to provide a substantially constant speed turbine system which permits the rotor discs of the turbine to maintain substantially constant speed responsive to the load applied to the turbine system. In this manner, substantial amounts of hardware are not required and further additional control systems are obviated to maintain the rotor discs operating at substantially constant speed. In prior art designs, such speed regulation has involved complex hardware and electronic system designs which have increased the capital expenditures as well as reducing the reliability of such systems. By providing an automatic system utilizing physical principles applied by predetermined positional locations of various elements within the systems, a constant speed system responsive to the load in an automatic fashion has now been achieved.

SUMMARY OF THE INVENTION

A power producing substantially constant speed rotary turbine that includes a shaft having first and second ends. A rotary power take-off is located adjacent the second end of the shaft and a compressor rotor is secured to the shaft intermediate the first and second ends thereof. An output power turbine rotor is coaxially aligned with the shaft and secured to the first end thereof. The turbine rotor is defined in side-by-side relationship with at least the outer portions of the discs being separated to form a plurality of circular passages that are in communication with passages in said discs inwardly disposed from the outer portions thereof. A first housing rotatably supports the power take-off and a section of the shaft intermediate the compressor rotor and second end of the shaft. Gear mechanisms in the first housing are utilized for transferring rotary motion of the shaft to the power take-off at a reduced rate of rotation. A housing assembly is supported in fixed position relative to the first housing and envelops the compressor rotor and has an air intake therein. The housing assembly includes a plurality of outwardly extending circumferentially spaced diffuser tubes arranged in first and second groups that receive air accelerated by the rotation of the rotor and the air discharges through the diffuser tubes at a first velocity. The housing assembly further includes first and second oppositely disposed volute casings that are in communication with the first and second groups of diffuser tubes. Air discharged into the first and second volute casings have a second velocity which is substantially less than the first velocity and the static head of air entering the first and second volute casings is substantially greater than the static head of air entering the diffuser tubes. The housing assembly has a first end portion that rotatably supports a section of the shaft adjacent the power output rotor. A second housing extends around at least the outer circumferential portion of the output power turbine rotor with the second housing supported from the first end portion of the housing assembly. First and second combustion tubes extend from the first and second volute casings to the first and second inlets. Additionally, first and second fuel burning mechanisms in the first and second combustion tubes with the first and second fuel burning mechanisms resulting in gaseous products of combustion discharging from the first and second combustion tubes at a velocity greater than the velocity of air in the first and second volute casings. A plurality of circumferentially spaced nozzles which are supported in a stationary position in the second housing are inclined with respect to the circumferential passages. The nozzles are in fluid communication on opposing ends with the circumferential passages and the first and second combustion tubes. The nozzles subdivide the gaseous products of combustion into a plurality of streams issuing therefrom that are substantially tangentially positioned relative to the circumferential passages for issuance of the second streams tangential to a peripheral surface of the discs and for forcing the gases in a helically directed path within said passages. The streams flow through the passages losing energy due to boundary layer drag with the discs and have the pressure thereon force the streams inwardly relative to the discs to discharge to the ambient atmosphere through the passage mechanism. The output power turbine rotor has rotational power imparted thereto that is related to the difference in energy of the air streams and the energy of the products of combustion discharging from the passage mechanisms. The turbine has inherent speed regulation since as the load on the power take-off is reduced and the power take-off rotor speeds up, the centrifugal force applied to the gaseous products of combustion streams issuing from the nozzles increases as the square of the rotative speed of the rotor and when the centrifugal force equals the pressure ratio force across the discs, the streams issuing from the nozzles are substantially reduced in discharge rate and the streams are forced to rotate in a circular path external to the discs rather than in an inward helix path to discharge through the passage mechanism thereby lowering the speed of the rotor.

DESCRIPTION OF THE PREFERRED EMBODIMENTS

Figure 1:
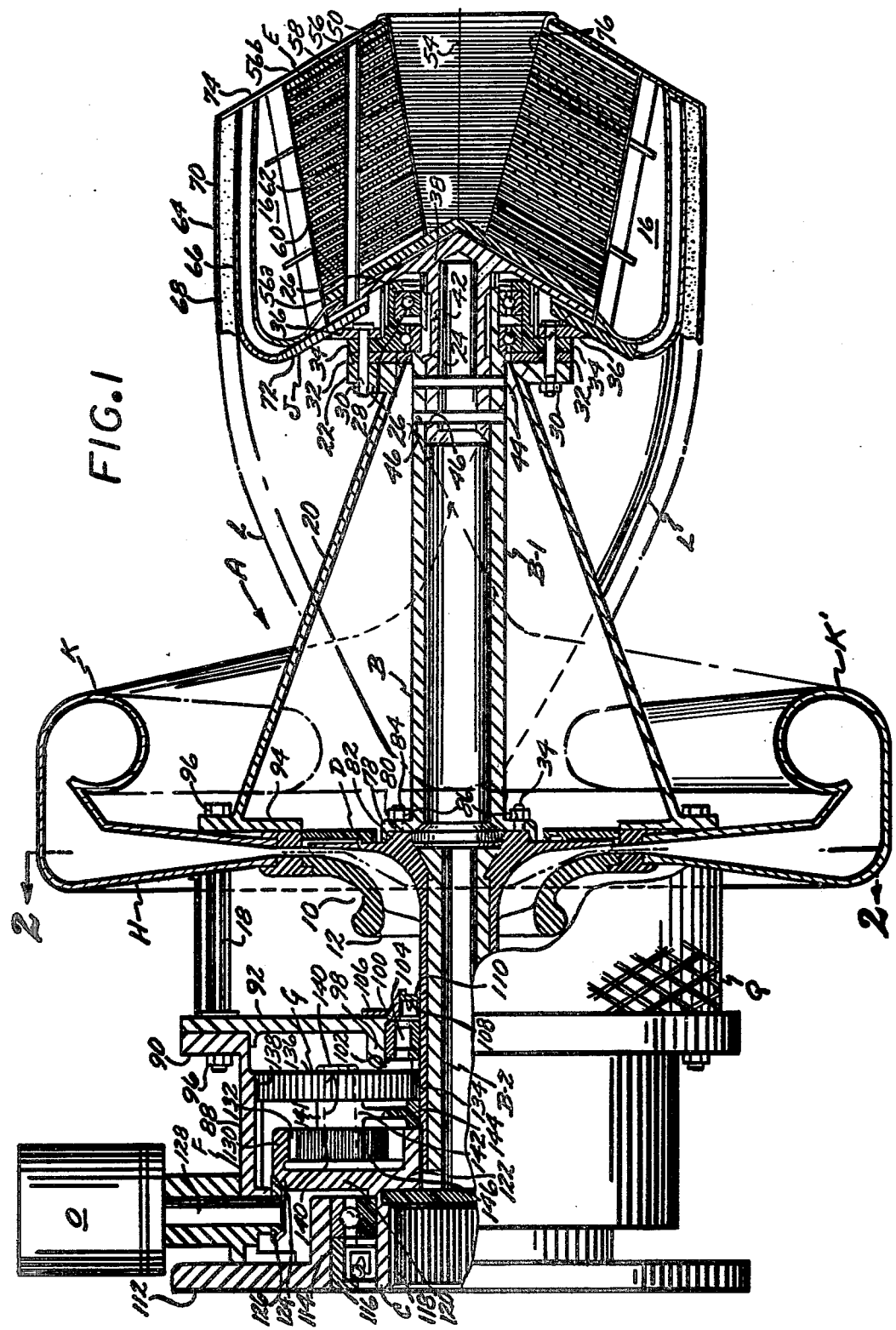
FIG. 1 is a longitudinal cross-sectional view of the power producing substantially constant speed rotary turbine.

The constant speed rotary turbine A is illustrated in the drawings as including an elongate shaft B that is illustrated in FIG. 1 as having a rotary power take-off C adjacent one end thereof. Shaft B supports a single stage compressor rotor D at an intermediate position thereon.

The shaft B is operatively connected to an output power turbine rotor E. A first housing F rotatably supports an end portion of shaft B, which shaft when rotated, drives a series of speed reducing gears G that drive a rotary power take-off C.

Figure 2:
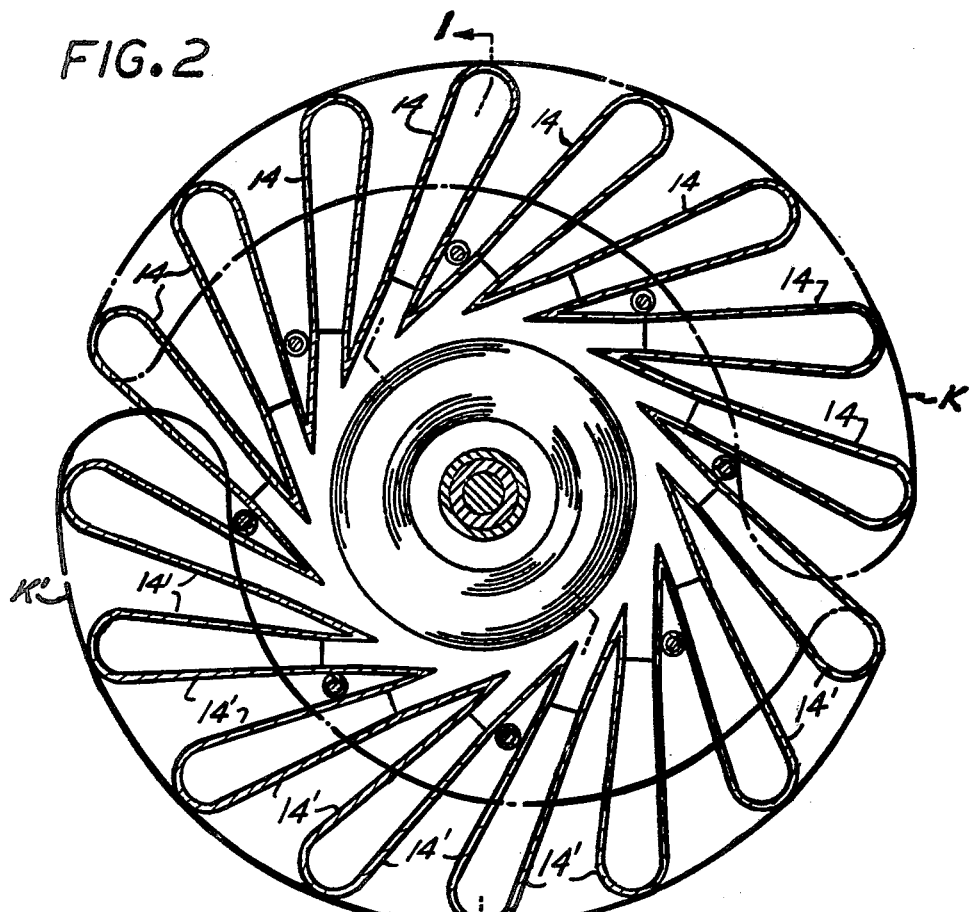
FIG. 2 is a transverse cross-sectional view of the device taken along the section line 2—2 of FIG. 1.

A housing assembly H envelops the compressor rotor D. The turbine rotor E has at least the outer portion thereof enveloped by a second housing J. The housing assembly H, as may best be seen in FIGS. 1 and 2, includes a center portion 10 in which an air inlet 12 is defined.

The center portion 10 has a number of circumferentially spaced, radially disposed, first and second diffuser tubes 14 and 14' extending outwardly therefrom, which tubes are of tapered configuration. The first and second tubes 14 and 14' are arranged in first and second groups, which groups extend to first and second oppositely disposed volute casings K and K'. First and second volute casings K and K' have first and second combustion tubes L and L' projecting therefrom to opposite sides of second housing J. Combustion tubes L and L' terminate in a number of circumferentially spaced nozzles 78 located in second housing J. First and second combustion tubes L and L' each have a burner can M disposed therein that is supplied fuel to a conduit N. A power operated starter O is mounted on the first housing and is capable of driving reducing gears G in the initial operation of the turbine A.

The first housing F, housing assembly H, and second housing J are illustrated as being coaxially aligned, as best seen in FIG. 1. The first housing F and housing assembly H are longitudinally spaced from one another in fixed relationship. A cylindrical protective screen Q is disposed in the space between the first housing F and housing assembly H and envelops the air inlet 12.

The housing assembly H is supported in a fixed position relative to a first housing F by a number of circumferentially spaced, longitudinally disposed bolts 18. A support 20 extends from housing assembly H towards the second housing J, with the free end of the support 20 being in the flange 22.

Shaft B is illustrated in FIG. 1 as being of tubular construction. The shaft B is formed from coaxially aligned first and second tubular sections B-1 and B-2. First shaft section B-1 has a first end 24 that is rotatably supported by two ball bearing assemblies 26 that are separated by a spacer 28. A number of circumferentially spaced bolts 30 engage aligned openings in ball bearing assembly retaining member 32 and 34 and a circular flange 36 that extends inwardly from second housing J. Ball bearing assemblies 26 are supported by retaining members 32 and 34.

A head 38 is provided that has a conical face 40 and a tubular portion 42 that extends into the first end 24 of first shaft section B-1. The head 38 is secured to the first shaft section B-1 by a plurality of pins 44. The pins 44 engage transversely aligned bores 46 formed in first shaft section B-1 and tubular portion 42, as shown in FIG. 1.

Figure 3:
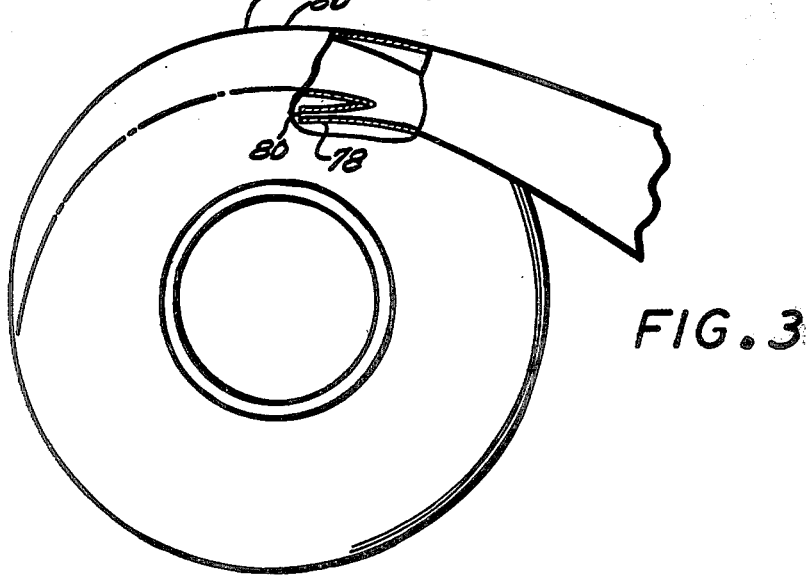
FIG. 3 is an end elevational view of the invention, partially broken away to illustrate a number of circumferentially spaced vanes in the turbine housing that subdivide the hot gaseous products of combustion discharged into the turbine housing into a number of streams that are directed through nozzles positionally located for issuing hot gaseous products in a tangential manner when taken with respect to an outer portion or outer peripheral surface of the turbine rotors to rotate the latter.
Figure 4:
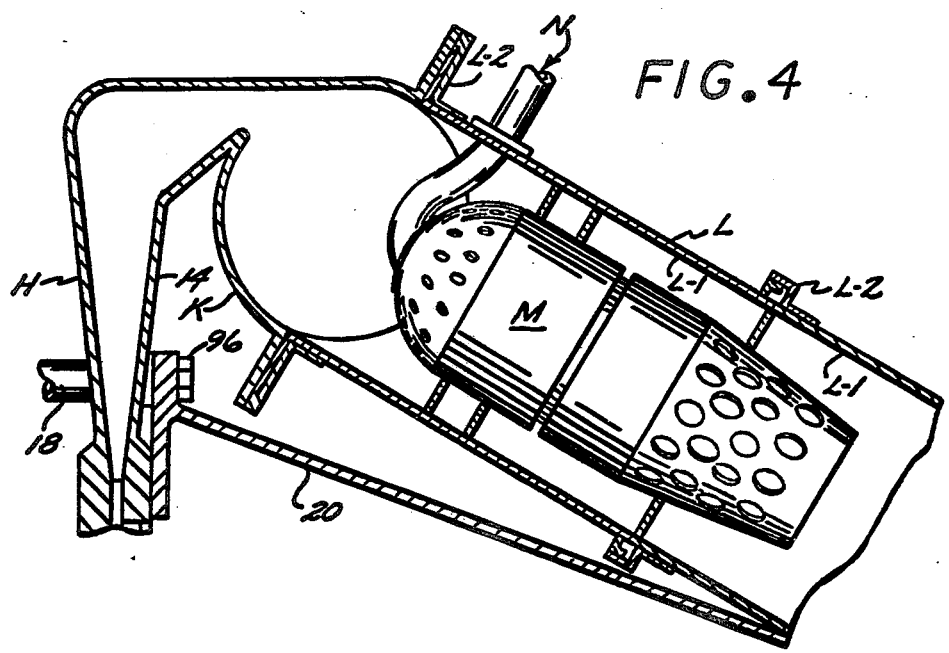
FIG. 4 is a fragmentary longitudinal cross-sectional view of one of the diffuser tubes, the volute casing, and a portion of one of the combustion tubes that has a burner can situated within the interior thereof.
Figure 5:
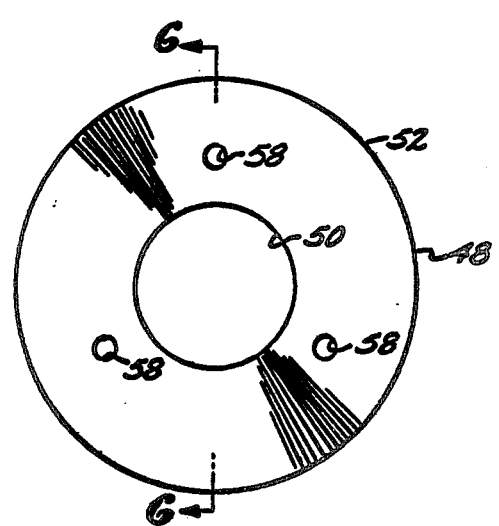
FIG. 5 is a side elevational view of one of the turbine rotor discs showing a circular outer periphery or outer peripheral wall of the turbine rotor disc to which the nozzles are tangentially directed; and, FIG. 6 is a transverse cross-sectional view of the discs taken along the section line 6—6 of FIG. 5.
Figure 6:
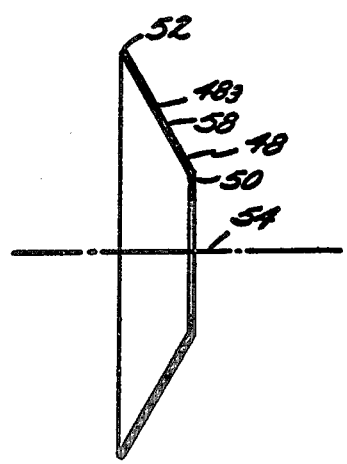

The turbine rotor E includes a number of ring-shaped discs 48, with each disc having an inner and outer periphery 50 and 52 as shown in FIGS. 5 and 6. Each disc 48 has the annulus-shaped body 48a thereof angularly disposed relative to the axis of rotation 54 of the disc 48. As will be described in following paragraphs, flat nozzles 78, clearly seen in FIG. 3, are positionally located in order to emit products of combustion in a stream which is substantially tangential to outer periphery 52 of discs 48. This substantially tangential flow of gases to the outer peripheral wall 52 of discs 48 provides a high tangential velocity vector while maintaining a low radial velocity vector when taken with respect to axis 54 of discs 48. With a low radial velocity vector, it will be shown, that the rotation of discs 48 and the associated centrifugal force applied to the gaseous products emitted from nozzles 78, acts in an opposing radial direction to radial forces driving the gases toward passages 76 at the center of discs 48 and permits automatic rotary speed control of discs 48. It is noted that if nozzles 78 were provided in a positional location having a high radial velocity vector, the pressure differences between the exiting gases from nozzles 78 and the passages 76 would be too large to allow control by the centrifugal radially outward directed forces applied to the gas streams and thus no control could be maintained solely responsive on the load of the system.

A number of elongate, circumferentially spaced, rigid supports 56 extend outwardly from the conical face 40 of head 38, as shown in FIG. 1. The supports 56 are parallel to the axis of rotation 54 of the discs 48. The supports 56 have an inwardly disposed conical plate 56a mounted thereon. The supports 56 extend through a number of circumferentially spaced openings 58 formed in the discs 48 as shown in FIGS. 1 and 5, with the discs 48 being disposed side-by-side, but separated by washer shaped spacers 60 mounted on the supports 56. The discs 48 and spacers 60 are held in fixed longitudinal positions on the supports 56 between the conical plate 56a and an outer ring-shaped plate 56b secured to the supports 56.

Discs 48 and spacers 60 cooperate to define ring-shaped passages 62 therebetween through which the hot gaseous products of combustion flow from the discharge openings 16 and 16'. The discs 48 have the same general shape, but with each having inner and outer peripheries 50 and 52 that are different in diameter from that of the discs 48 adjacent thereto. It is the gaseous products of combustion flowing through the ring-shaped passages 62 that have acted thereupon the opposing radial forces provided by the centrifugal force of the rotating discs 48 and the static pressure drop forces driving the gaseous products toward the longitudinally divergent passage 76 formed around the axis of rotation 54. The gaseous products of combustion are driven in a helical path and the frictional force applied on opposing flattened surfaces of discs 48 defining the passages 62 provides for the rotary driving force of rotor discs 48.

The discs 48 are preferably formed from a high temperature ceramic such as hot pressed silicone nitride that is commercially available. Discs 48 formed from this material will withstand a temperature of 2500° to 2800° F., without permanent deformation or suffering from other adverse effects.

The exterior of the first and second combustion tubes L and L' and the outer circumferential portion of the second housing J are defined by first and second radially spaced walls 64 and 66 that have a space 68 therebetween filled with a heat insulating material 70.

First and second walls 64 and 66 forming a part of second housing J are connected on one end to a ring-shaped wall 72 that extends outwardly from flange 36 and on the other end to a ringshaped wall 74. The inner peripheries 50 of the discs 48, as may be seen in FIG. 1, cooperate to define the longitudinally diverging passage 76 through which the hot gaseous products of combustion discharge after traversing the passages 62.

A number of circumferentially spaced flat nozzles 78 as shown in FIG. 3, of at least the width of rotor E extend around the discs 48 in second housing J, and are secured to walls 72 and 74. The nozzles 78 are in communication with first and second combustion tubes L and L'. The nozzles 78, due to the circumferential spacings therebetween, subdivide the hot gaseous products of combustion flowing into the second housing J into a number of high velocity streams that are tangentially diverted to turbine rotor E and flow into passages 62.

The hot gaseous products being emitted from the openings 180 of the flat nozzles 78 include both a static pressure and a dynamic pressure. The nozzles 78 are positionally located in a manner to provide the emitted gaseous products to have a velocity component which is substantially tangential to the outer periphery 52 of the discs 48. The static pressure drop between the openings 180 and the longitudinally diverging passage 76 causes the gaseous products to be forced in a direction in an inwardly radial direction toward the passage 76 through the passages 62. Since the nozzles 78 are positioned in a tangential manner to the outer periphery 52 of the discs 48, the dynamic pressure fluid flow of the combustion gases has a high component to the arcuate walls 52 at the radial ends of the discs 48. The static pressure drop will cause the force in a radial inward direction to drive the gaseous products in a helical path toward the passage 76.

The high velocity streams, upon entering the passages 62, lose energy due to boundary layer drag. The streams, pursue the helix path in flowing through the passages 62. The force that tends to rotate the rotor E is the drag imposed thereon due to the passage of the hot products of combustion gases as they contact the discs 48 in flowing through the passages 62. The drag force may be determined by the formula:

$$D = c_d (P/2) SV^2 \quad (1)$$

WHEREIN:
$c_d$ = the coefficient of drag
P = the density of the gases
S = the area of the discs 48
V = the velocity of the streams of hot gaseous products of combustion The horsepower generated by the turbine rotor E is seen to be:

$$H.P. = DV/550 \quad (2)$$

WHEREIN:
D = drag in pounds
V = velocity of products of combustion in feet per second The kinetic energy of the turbine rotor E may be raised by increasing the velocity at which the streams of hot gaseous products of combustion discharge through the passages 62. This increase in velocity is achieved by compressing air to a ratio of up to 25 to 1 in the compressor and discharging into the first and second combustion tubes L and L' prior to the air being heated by the burners M to further expand.

The maintenance of the constant speed of the discs 48 is believed to be derived from the positional location and direction properties of the products of combustion issuing from openings 180 of nozzles 78. The thermodynamic and fluid dynamic properties when taken in combination with the particular physical location and directional maintenance of the nozzles 78 yields a system which permits the discs 48 to be maintained at substantially constant rotary speed responsive to changes in the load. For an inviscid, in compressible fluid Bernoulli's equation provides:

$$p_T = p_{ST} + PV^2/2 \quad (3)$$

WHEREIN:
$p_T$ = total pressure
$p_{ST}$ = static pressure of fluid
P = density of the fluid
V = velocity of the fluid As can be seen by this equation, which is an approximation to the actual real fluid flowing through the passages 62, the total pressure is made up of both the static pressure and the dynamic pressure components. It is to be remembered that the dynamic pressure component which is highly dependent upon the velocity direction from openings 180 in nozzles 78 is directed in a substantially tangential manner to the peripheral outer walls 52 of discs 48. Thus, the total pressure of the fluid is made up of both a static component and a dynamic component having a directional property substantially tangential to the outer peripheries of discs 48.

The centrifugal force acting on the fluid in an outward radial direction may be shown:

$$F_c = PV_\theta^2/r \quad (4)$$

WHEREAS:
$F_c$ = centrifugal force acting on fluid in an outward radial direction
P = density of fluid
V = velocity of the fluid in a direction normal to the radial direction
r = distance from the axis of rotation 54

This force is acting in a manner to drive the fluid outward from the passages 62 external to the outer peripheries 52 of the discs 48. In opposition, the static pressure drop force which results from the static pressure from the openings 180 to the static pressure within the passage 78 tends to displace the fluid toward the longitudinally divergent passages 76 in an inward radial manner. This static force acting on the fluid can be shown to:

$$F_{ST} = A(p_{ST} - p_O) \quad (5)$$

WHEREIN:
$F_{ST}$ = force of fluid due to static pressure drop
A = area on particular fluid in passages 62
$p_{ST}$ = static pressure at opening 180
$p_O$ = static pressure within passages 76

Although these equations represent approximations to the real system, it is believed that these force equations provide the major components in the displacement of the fluid within passages 62. As can be seen between equations 4 and 5, the centrifugal force $F_c$ is in an opposing radial direction to the static pressure force drop $F_{ST}$. As load is applied to the overall system, discs 48 begin to decrease in rotary speed. This has the effect of lowering the fluid speed $V_\theta$ and as seen in equation 4, reduces the centrifugal force $F_C$ acting in an outward radial manner on the fluid. Thus, the static drop force on the fluid $F_{ST}$ becomes greater in relation to the centrifugal force drawing more fluid through the passages 62 to produce more boundary layer drag resulting in an increase in the rotary speed of the discs 48. In an opposing manner, when load is reduced, there is a tendency of the discs 48 to increase in rotary speed which has the effect of increasing the centrifugal force on the fluid. When the centrifugal force becomes larger than the static drop force, the products of combustion are forced external to the outer periphery 52 of the discs 48. This results in less boundary layer drag applied to the flattened portions of discs 48 and thus the speed of the discs 48 are reduced.

In operation, combustion gases after passing from the compressor rotor D are heated in the combustion tubes L and are inserted into the second housing J. As is shown in FIG. 3, flat nozzles 78 having external openings 180 mounted in a particular positional relation to the discs 48 issue the hot gases in a high velocity stream tangential to the circular passages 62 formed between the discs 48. The streams of gas are driven helically toward the longitudinally divergent passage 76 at the center portion of the discs 48. The boundary drag, due to the frictional contact of the streams with the flattened portions of the discs 48, provide for rotational force to be applied to the discs 48 and consequently such is coupled in rigid constraint to the shaft which is rotatably actuated.

As the load is changed on the power take-off unit C, the particular location and inclination as well as the nozzles themselves, provide for the speed regulation of the turbine rotor E. Assuming for example, that the load is diminished on the power take-off unit C, there is the effect of the increase of the rotary speed of the shaft D and the discs 48 of the turbine rotor E. The streams issuing from the nozzles 78 include a radially directed velocity component toward the passage 76. Opposing this at all times, is the centrifugal force which is caused by the rotation of the discs 48 and is directed in a radial outward direction. When the centrifugal forces acting on the streams equals the pressure ratio force across the discs 48, the streams issuing from the nozzles 78 are directed substantially outward from the outer peripheries 52 of the discs 48. The rotor discs 48 thus do not have as much frictional drag imposed on them, and further the discs 48 then begin to slow down responsive to the force changes. Once the discs 48 begin to slow down, such provides a lower rotary speed for the shaft B and thus there is an inherent speed regulation for the entire system. In opposition, when the load is increased on the take-off unit C, the reverse argument can easily be seen to be made as has hereinbefore been described to provide an increase in the speed of the discs 48 of the turbine rotor E.

The first section B-1 of shaft B has a second end that is defined by a flange 178 having circumferentially spaced openings 80 therein as shown in FIG. 1. Shaft section B-2 has a first end that is defined by a circular member 82 from which stud bolts 84 extends that project through openings 80. Nuts 86 engage bolts 84 to secure the shaft sections B-1 and B-2 together in coaxial alignment.

The first housing F includes a cylindrical shell 88 that, on a first end thereof, develops into an outwardly directed flange 90. A first end wall 92 abuts against flange 90 and is secured thereto by bolts 18. The support 20 of housing assembly H has a second flange 94 supported therefrom. The bolts 18 extend through aligned openings (not shown) in flange 90, first end wall 92, and second flange 94. Nuts 96 engage projecting threaded ends of bolts 18. The bolts 18 and nuts 96 cooperate to hold first housing F and housing assembly H together as an integral unit.

First end wall 92 includes a tubular center portion 98 in which a ball bearing assembly 100 is disposed that rotatably supports second shaft section B-2. A snap ring 102 prevents ball bearing assembly 100 from moving longitudinally to the left as viewed in FIG. 1. The ball bearing assembly 100 is prevented from moving to the right relative to tubular center portion 98 by a circular lip 104 that projects inwardly from the latter. A circular member 106 of L-shaped transverse cross-section is supported from first end wall 92 and holds a seal 108 in sliding contact with second shaft B-2. Seal 108 is in contact with a circular shoulder 110 that forms a part of second shaft section B-2.

First housing F includes a second end wall 112 that has a tubular boss 114 formed as a part thereof in which a ball bearing assembly 116 is disposed that rotatably supports the power take-off C. The power take-off C includes an internally splined cylindrical shell 118 situated within the interior of ball bearing assembly 116, which shell develops on the interiorly disposed end thereof into a wheel 120. Wheel 120 includes a hub 122 rotatably supported on second shaft section B-2. The wheel 120 has a number of circumferentially spaced angularly disposed teeth 124 formed on the outer periphery thereof that may be removably engaged by a conical gear 126 supported from a drive shaft 128 that forms a part of starter 0. Wheel 120 has a circular rim 130 projecting outwardly therefrom that has a ring gear 132 defined on the interior surface thereof.

Second shaft section B-2 has a first gear 134 thereon that is in toothed engagement with a second gear 136 of substantially greater diameter. The second gear 136 is also in engagement with a third gear 138. The third gear 138 is in the form of ring gear defined on the interior surface shell 88, as best seen in FIG. 1. Second gear 136 is secured to a shaft 140, which shaft is rotatably supported in a journal 141 on the outer end of an arm 142. An inner end of arm 142 is secured to a tubular sleeve 142 that is rotatably mounted on second shaft section B-2. Shaft 140 has a fourth gear 146 secured thereto. Fourth gear 146 is in toothed engagement with ring gear 132. The gearing above mentioned is of the compound epicyclic type and is referred to as a whole by the letter G.

As first gear 134 rotates due to rotation of second shaft section B-2, second gear 136 is concurrently rotated. Second gear 136 is in toothed engagement with stationary third gear 138, and as a result, arm 142 is caused to revolve about second shaft section B-2, moves the driven fourth gear 140 therewith and the rotary motion of the fourth gear being imparted to ring gear 132 to drive the internally splined power take-off shell 118. With the compound epicyclic reducing gears G above-described, the rate of rotation of the splined power take-off shell 118 is approximately one-sixth to one-fifth that of the second shaft section B-2.

The use and operation of the invention is as follows: The starter 0 is utilized to cause initial rotation of the first and second shaft sections B-1 and B-2, together with that a compressor rotor D and turbine rotor E. The burner cans M are ignited, with fuel being supplied thereto through conduits N. Air is drawn through intake 12 in center portion 10 of housing assembly H discharged by compressor rotor D to first and second diffuser tubes 14 and 14' from which the air flows to first and second volute casings K and K'. Due to the configuration of the volute casings K and K', the velocity of the compressed air discharged therein from the first and second diffuser tubes 14 and 14' decreases and the static pressure thereon increases. The air at substantial static pressure is discharged to the first and second or more combustion tubes L and L' where it is heated by the burner cans M to high temperatures. The high temperature compressed air, together with the gaseous products of combustion, flow to the second housing J to enter the interior thereof through the nozzles 78.

The heated gaseous products of combustion flow through the nozzles 78 to be subdivided into a number of high velocity streams or jets that enter the passages 62 in turbine rotor E. The streams as they flow through a helix path in the passages 62, lose energy due to boundary layer drag with discs 48. The drag on the discs 48 causes the rotation of turbine rotor E and first and second shaft sections B-1 and B-2. Rotation of second shaft section B-2 results in rotation of the reducing gears G and concurrent rotation of the power take-off C. Power take-off C preferably rotates at one-sixth to one-fifth the speed of rotation of the turbine rotor E and shaft B. Both the discs 48 and spacers 60 are preferably formed from a high temperature ceramic such as hot pressed silicon nitride.

Although the discs 48 are illustrated as having the ringshaped portions 48a thereof angularly disposed relative to the axis of rotation 54, it is possible to use discs of the same design that are disposed normally relative to the axis of rotation, but with less area. From experience, it has been found that optimum efficiency is attained when the velocity of the streams of hot gaseous products of combustion discharged into the passages 60 is just below supersonic, and the flow of the streams through the passages being laminar.

The first and second or more combustion tubes L and L' are preferably formed from end-to-end, disposed sections that L-1 and L'-1 that are joined by expansion joints L-2 and L'-2. The exterior of the burners M and interior surfaces of combustion tubes L and L' cooperate to define annulus-shaped spaces therebetween through which compressed air may flow. Although the invention has been illustrated as having two volute casings K and K' and two combustion tubes L and L', it is possible to use but a single volute casing and combustion tube, with the combustion tube in communication with a number of nozzles 78 circumferentially spaced about turbine rotor E.

It is thus to be understood that turbine system A includes power take-off mechanism C which is rotationally displaceable about a longitudinally extending axis of rotation defined by an axis of longitudinally extending elongate shaft B. Power take-off mechanism C is rotatably mounted within first housing F as shown in FIG. 1. Housing assembly H contains compressor rotor D mounted therein. Diffuser tubes 14 and 14' extend substantially in a radial outward direction from the axis of rotation defined by longitudinally extending shaft B for discharge of air take-in through air inlet 12.

As has been previously described, first and second volute casing members K and K' are in fluid communication with diffuser tubes 14 and 14' for directing the discharged air in a predetermined contoured path. Fuel combustion systems or mechanisms M are coupled to the volute casing members K and K' for issuing products of combustion of the air and a fuel combusted within combustion mechanisms M. The fuel combustion mechanisms or combustion cans M are positionally located within combustion tubes L and L' which extend from first and second volute casings K and K' to second housing J.

Output power turbine rotor mechanism E is mounted within second housing J and is coupled to power take-off system C by rotational shaft member B extending in the longitudinal direction through compressor rotor D. Turbine rotor E includes a plurality of disc members 48 displaced each from the other in the longitudinal direction to form a plurality of circular passages 62 extending from an outward portion when taken with respect to the radial direction of the axis of rotation, to an inner passage formed through each of disc members 48. A plurality of nozzle members 178 are in fluid communication on opposing ends thereof with fuel combustion mechanisms M within combustion tubes L and L' and further nozzle members 178 are in communication with the aforementioned circular passage 62. As has previously been described, nozzle members 178 are positionally located for directing products of combustion substantially tangential to the contour of peripheral outer wall 52 of disc members 48.

Each of disc members 48 are formed in a substantially symmetric contour when taken with respect to the longitudinally extending axis of rotation. Further, disc members 48 are provided with annularly contoured base member 48a as is clearly seen in FIGS. 5 and 6. From previous empirical experiments, it has been found that there is a tendency for disc-like members which are formed in a planar member to flutter or vibrate at resonant rotational speeds. It has thus been found highly advantageous to provide disc members in an overall frusto-conical contour as shown in FIG. 1 which apparently provides for additional rigidity of disc members 48 and has been found to substantially eliminate vibrational flutter. Thus, as shown in FIG. 1, disc members 48 are formed in a manner such that they are angularly disposed relative to the axis of rotation. In this manner, base members 48a are formed in a substantially frusto-conical contour. Additionally, and of some importance, it is to be noted that the frusto-conical contour of disc members 48 provide for a larger surface area through which the air discharged from the nozzles 178 passes. Since rotation of disc members 48 are dependent on frictional contact of the rotating air mass on the base members or body member 48a of the discs 48, the efficiency of the utilization of the displaced air passing through passages 62 is increased by the use of frusto-conical shaped disc members 48.

Due to the high temperatures involved in turbine system A, disc members 48 have been formed of a ceramic material having structural operational capability for withstanding products of combustion temperatures approximating 3000° F. Additionally, it is noted that disc members 48 have inner peripheries 50 of differing diameters in a manner such that the diameters of inner peripheries 50 are monotonically increasing from one of disc members 48 to a next consecutively positioned disc member 48 for defining longitudinally diverging inner passage 76 throughout the nested set of disc members 48 seen in FIG. 1.

The structure of the invention and operation thereof has been previously described in detail and need not be repeated.

What is claimed is:
1. A turbine system comprising:
(a) power take-off means being rotationally displaceable about a longitudinally extending axis of rota- tion, said power take-off means being rotatably mounted within a first housing;

(b) compressor rotor means mounted within a housing assembly having at least one diffuser tube extending in a radial outward direction from said axis of rotation direction for discharge of air from said compressor rotor means;

(c) at least one volute casing member in fluid communication with said diffuser tube for directing said air in a predetermined path;

(d) fuel combustion means coupled to said volute casing for issuing products of combustion of said air and a fuel combusted in said combustion means; and, (e) turbine rotor means mounted within a second housing, said turbine rotor means being coupled to said power take-off means by a rotational shaft member extending in said longitudinal direction through said compressor means, said turbine rotor means including (1) a plurality of disc members displaced each from the other in said longitudinal direction to form a plurality of circular passages extending from an outer portion to an inner passage formed through each of said disc members, said plurality of discs defining a peripheral outer wall and, (2) at least one nozzle member in fluid communication on opposing ends thereof with said fuel combustion means and said circular passages, said nozzle member being positionally located for directing said products of combustion substantially tangential to the contour of a peripheral outer wall of said disc members.

2. The turbine system as recited in claim 1 where said disc members are formed in a substantially symmetric contour when taken with respect to said longitudinally extending axis of rotation.

3. The turbine system as recited in claim 1 where each of said disc members includes an annularly contoured base member.

4. The turbine system as recited in claim 3 where said base member of each of said disc members is angularly disposed relative to said axis of rotation.

5. The turbine system as recited in claim 4 where said disc base members are formed in a substantially frusto-conical contour.

6. The turbine system as recited in claim 5 where said disc members are formed of a ceramic material, said ceramic material having a structural operational capability for withstanding said products of combustion temperatures approximating 3000° F.

7. The turbine system as recited in claim 5 where said inner passages of each of said disc members includes a monotonically increasing diameter from one of said disc members to a next consecutively positional disc member for defining a longitudinally diverging inner passage through said disc members.

8. The turbine system as recited in claim 1 where said fuel combustion means is positionally located within at least one combustion tube member extending from said volute casing member to said second housing.

9. The turbine system as recited in claim 8 where said nozzle member is fixedly positioned in said second housing for fluid communication between said fuel combustion means and said circular passages.

10. The turbine system as recited in claim 8 where said products of combustion directed substantially tangential to said peripheral outer wall contour include a high tangential velocity vector component magnitude when taken with respect to a radial velocity vector component from said axis of rotation.

11. The turbine system as recited in claim 1 where said power take-off means includes reduction gear means mounted in said first housing coupled to said longitudinally extending shaft for transposing said rotative displacement of said shaft to said power take-off means at a reduced rate of rotation.

12. The turbine system as recited in claim 11 where said reduction gear means includes compound epicyclic gear reduction means, at least one gear member of said gear means being stationarily secured to said first housing.

13. The turbine system as recited in claim 1 including at least one combustion tube extending from said volute casing member to said second housing, said fuel combustion means being mounted within said combustion tube.

14. The turbine system as recited in claim 13 where said compressor rotor means includes a single stage rotor, said air being discharged from said rotor having a compressibility ratio within said volute casing member and said combustion tube within a range approximating 8.0–25.0:1.0.

15. The turbine system as recited in claim 14 where each of said disc members is formed by an annularly contoured base member being angularly disposed relative to said axis of rotation.

16. The turbine system as recited in claim 15 where said disc base members are formed in a substantially frusto-conical contour.

17. The turbine system as recited in claim 16 where said disc members are formed of a ceramic material having a structural integrity operating capability at a temperature approximating 3000° F.

18. The turbine system as recited in claim 17 where said fuel burning means include burner can means adapted to combust particulate, liquid, and gaseous fuel and combinations thereof.

19. The turbine system as recited in claim 1 where said turbine rotor means includes:

(a) a head member fixedly secured to a first longitudinally directed end of said shaft member; and, (b) a plurality of pin members secured to said head member extending in said longitudinal direction substantially parallel to said shaft member, said disc members having a ring contour including aligned openings formed therethrough for engagement of said pin members.

20. The turbine system as recited in claim 19 where said pin members are circumferentially displaced each from the other in spaced relation from said axis of rotation.

21. The turbine system as recited in claim 20 including a plurality of spacer members mounted on said pin members, said spacer members being interposed between adjacent consecutive disc members for maintaining said ring-shaped disc members in fixed spaced relation.

22. The turbine system as recited in claim 21 where said head member includes a conical face surface contour, said pin members being secured to said head member and extending in said longitudinal direction.

23. The turbine system as recited in claim 22 where said ring-shaped disc members include a substantially constant width dimension between an inner periphery and an outer peripheral wall.

24. The turbine system as recited in claim 23 where said ring-shaped disc members are positionally located in substantially nested relation each to the other, said ring disc members being substantially parallel each to the other and said conical face surface.

25. The turbine system as recited in claim 24 where said disc members are formed from a high temperature ceramic material having an operational temperature capability approximating 2500° F.

26. The turbine system as recited in claim 25 where said shaft member is formed of a first portion and a second portion, each of said portions being axially aligned in said longitudinal direction and removeably secured each to the other, said first section of said shaft member including a first portion of said shaft member, including a first end secured to said head member and said second portion having a second end, said compressor rotor being formed as an integral part of said second end.

27. The turbine system as recited in claim 26 where said first housing and said housing assembly are discrete each from the other and displaced by a space that communicates with an air intake of said compressor rotor, said turbine system further including a cylindrical screen member that extends between said first housing and said housing assembly and envelopes said air intake of said compressor rotor.

28. The turbine system as recited in claim 26 which further includes power operated starting means mounted to said first housing, said power operated starting means being operatively coupled to said power take-off means.

* * * * *